United States Patent [19]
Milosevic

[11] Patent Number: 5,721,487
[45] Date of Patent: Feb. 24, 1998

[54] DIAGNOSTIC RANGE/POSITION MEASURING DEVICE

[75] Inventor: Dragutin Milosevic, Grosskrotzenburg, Germany

[73] Assignee: Honeywell Inc., Minneapolis, Minn.

[21] Appl. No.: 573,803

[22] Filed: Dec. 18, 1995

[30] Foreign Application Priority Data

Dec. 21, 1994 [DE] Germany .................... 44 45 819.3

[51] Int. Cl.$^6$ .................. G01B 7/00; G01B 7/14; G01D 5/20
[52] U.S. Cl. .................. 324/207.26; 324/207.19; 324/207.12
[58] Field of Search ............... 324/207.12, 207.16, 324/207.19, 207.26, 225

[56] References Cited

U.S. PATENT DOCUMENTS 5,223,830   6/1993   Romes ................ 324/207.19
5,525,900   6/1996   Larsen et al. .......... 324/202.19

*Primary Examiner*—Walter E. Snow
*Attorney, Agent, or Firm*—John G. Shudy, Jr.

[57] ABSTRACT

A sensor bridge circuit (20) sensitive to a proximate target (12). The bridge circuit (20) has two inductor (24, 28) and two resistors (32, 34). One inductor (24) has a reactance that varies with respect to the distance (26) of the target (12) from the inductor (24), which affects a balance of the bridge parameters of which is an indication of the distance (26). Another resistor (86) is connected in parallel to one bridge resistor (34) via an input (82) in the event where the target (12) is removed so that the displacement (26) of the sensor transfer characteristic is affected by an amount which results in a change of a diagnostic status indication (62). When the input (82) is not present, the status indication (62) should not appear in the event where the target (12) is far removed. Other resistors (42, 44) connected in parallel to bridge resistors (32, 34), via several inputs (46, 48), respectively, debalance or detune the bridge (20) so as to provide certain diagnostic information.

8 Claims, 4 Drawing Sheets

DIAGNOSTIC RANGE/POSITION MEASURING DEVICE

BACKGROUND OF THE INVENTION

The present invention pertains to electronic proximity detectors, and particularly to range/position measuring devices.

SUMMARY OF THE INVENTION

The range/position measuring or proximity measuring device has a balanced bridge which is utilized as a sensor when it is debalanced or detuned by an object whose distance or position is being measured. The object or target is a type of metallic actuating or affecting element. The bridge sensor is connected by means of wires to a remotely arranged interface. The sensor bridge circuit has an element having an inductive reactance that is affected by a presence of the target or object. Such reactance varies with a change of distance of the target from the element. The bridge circuit also has an element having a fixed inductive reactance. Both inductive element are operated in a bridge circuit together with resistors. The bridge circuit is interfaced with and receives electrical alternating current voltage excitation from an oscillator at a preferred constant frequency. The magnitude of the voltage, namely, the bridge voltage, appearing across the diagonal of the bridge of the two inductive elements and the two resistive elements, is a function of the range between the inductive element, having the variable inductance, namely, the sensing element, and the target. The bridge voltage is evaluated to determine the distance or position of the target. However, there is incorporated in the measuring device circuitry which implement certain tests (i.e., Built in Test=BITE), which detect and determine different error sources within the measuring device.

However, until now it was not possible to determine whether the unbalancing or detuning of the bridge circuit was due to the movement of the target to be detected or due to changes or variation in parameter values of the elements or components of the bridge circuit, caused by, for example, aging or deterioration of the components. For certain safety reasons in specific applications such as, for instance, the monitoring of the position of a landing gear of an aircraft to determine whether it is extended or not for landing the aircraft. The dependability of such a check is of paramount importance.

DESCRIPTION OF THE EMBODIMENT

Figure 1:
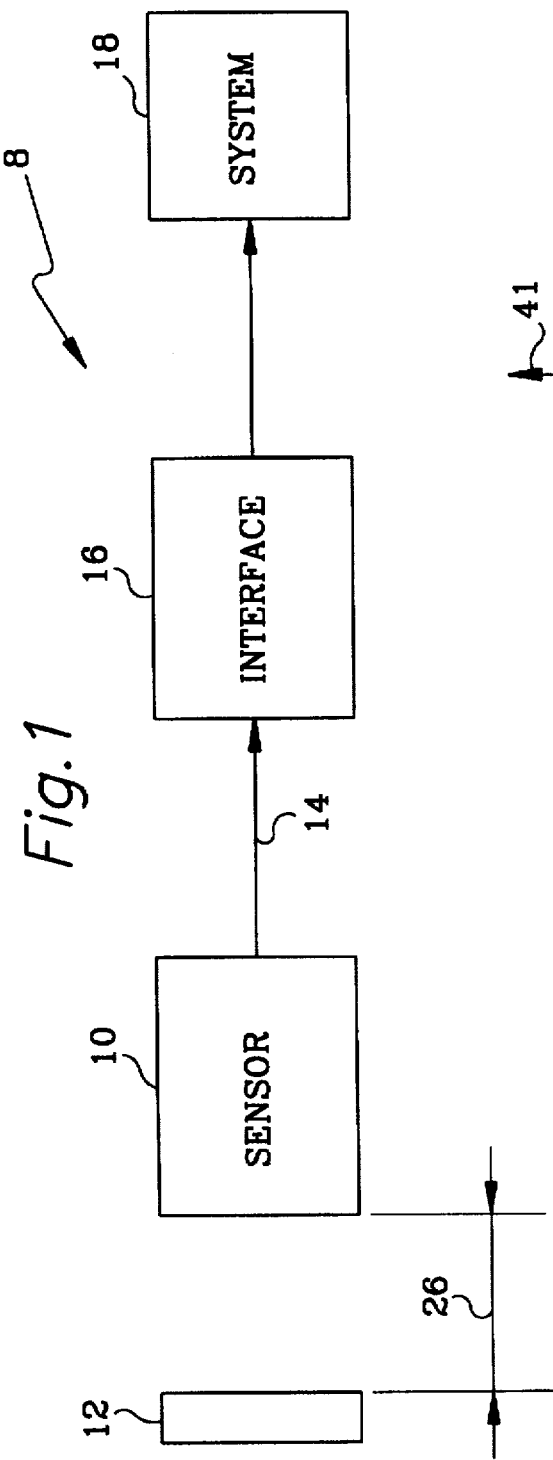
FIG. 1 is a block diagram of the range/position measuring device.

According to FIG. 1, a sensor 10 senses the proximity of a target 12 and provides its signal via a wiring 14 to a remotely arranged interface 16, which itself outputs the evaluated signal to a connected system 18.

Figure 2B:
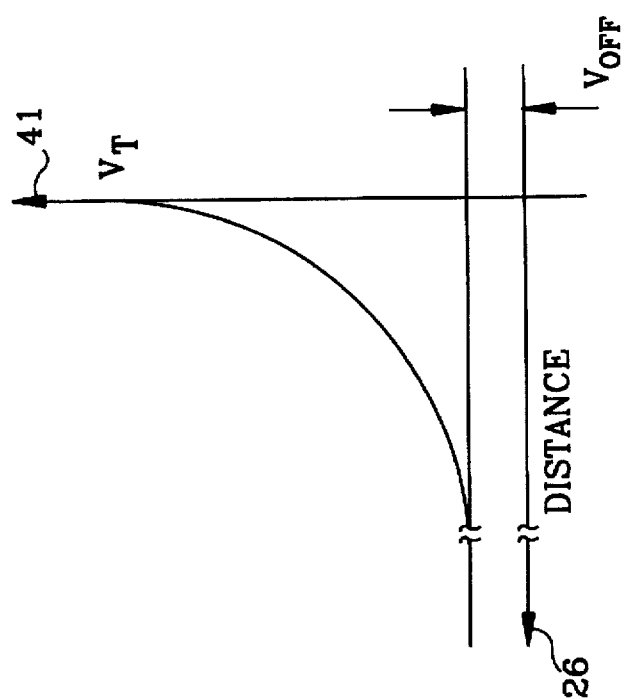
FIG. 2b is a graph of the transfer function of the measuring device, which shows the output voltage as a function of the target range.
Figure 2A:
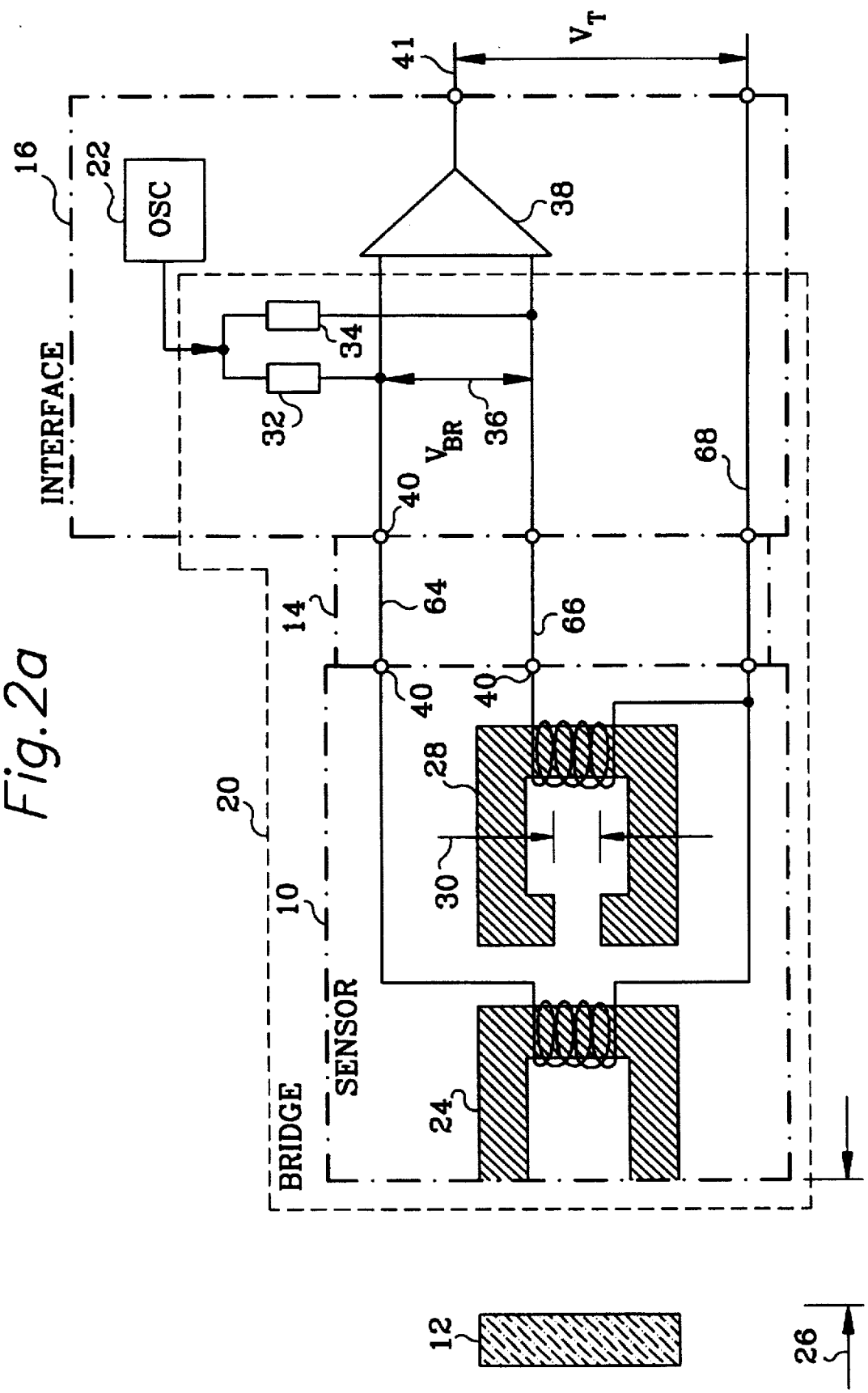
FIG. 2a reveals the basic circuitry of the measuring device.

According to FIG. 2a, sensor 10 and the interface 16 form a bridge circuit 20, which bridge 20 is supplied from an oscillator 22 arranged within interface 16 and having a constant frequency. Bridge circuit 20 comprises an inductive reactance 24 changeable by target 12 as a function of the range 26 and a fixed inductive reactance 28. By means of an air gap 30 within the core of the reference inductive reactance 28, bridge circuit 20 may be dimensioned or calibrated in such a way that with a remote target 12 (distance 26=infinity), a finite and defined offset voltage $V_{OFF}$ is present. When distance or range 26 of target 12 decreases from infinity (i.e., an imperceptible distance) to zero (contact), the inductive reactance and therefor the impedance of sensor coil 24 steadily increases.

Via the wiring 14 to each of coils 24 and 28, one of resistors 32 and 34 is respectively connected in series. To bridge 20 diagonal 36, a differential amplifier 38 is connected which senses the bridge 20 voltage $V_{BR}$ and outputs the measuring signal $V_T$ 41 of the measuring device 8.

The output voltage $V_T$ 41 of differential amplifier 38 therefor delivers a continual information about the range 26 between target 12 and sensor 10. A typical transfer characteristic $V_T=f(s)$ is shown in FIG. 2b.

By the use of passive sensor 10, the above-described circuit of device 8 distinguishes itself by an extremely high reliability which essentially is determined by the reliability of four soldered junctions 40 and such a circuit of device 8 therefor is preferably used in critical applications as, for example, at the landing gear control in an aircraft.

Critical applications require additionally different levels of function monitoring or error recognition and signaling, and diagnostics. For this purpose, according to FIG. 3, resistors $R_N$ 42 and $R_F$ 44 may be connected in parallel with resistors 32 and 34 via inputs BN (BITE Near) 46 and BF (BITE Far) 48 at interface 16 and via switches 50 and 52. Connected in parallel to output 41 of differential amplifier 38, are a threshold value switch SS 54 and a window discriminator FD 56 which are fed by a reference voltage REF 58 and which provide an output signal AUS 60 and a status signal STA 62. Additionally, output signal $V_T$ of differential amplifier 38 is directly outputted at an output 41.

Figure 3:
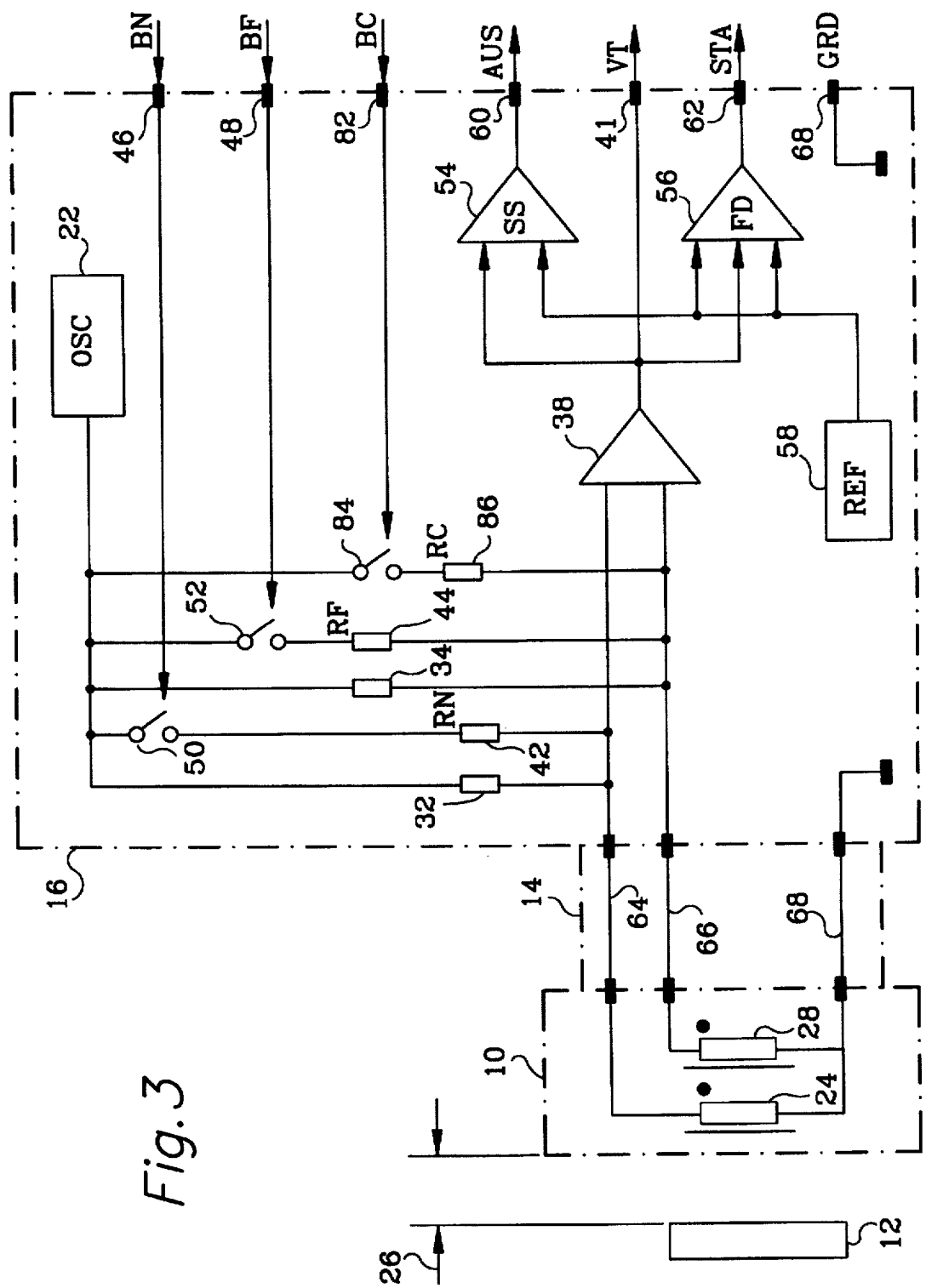
FIG. 3 exhibits the testing and evaluation circuitry incorporated into the measuring device.
Figure 4:
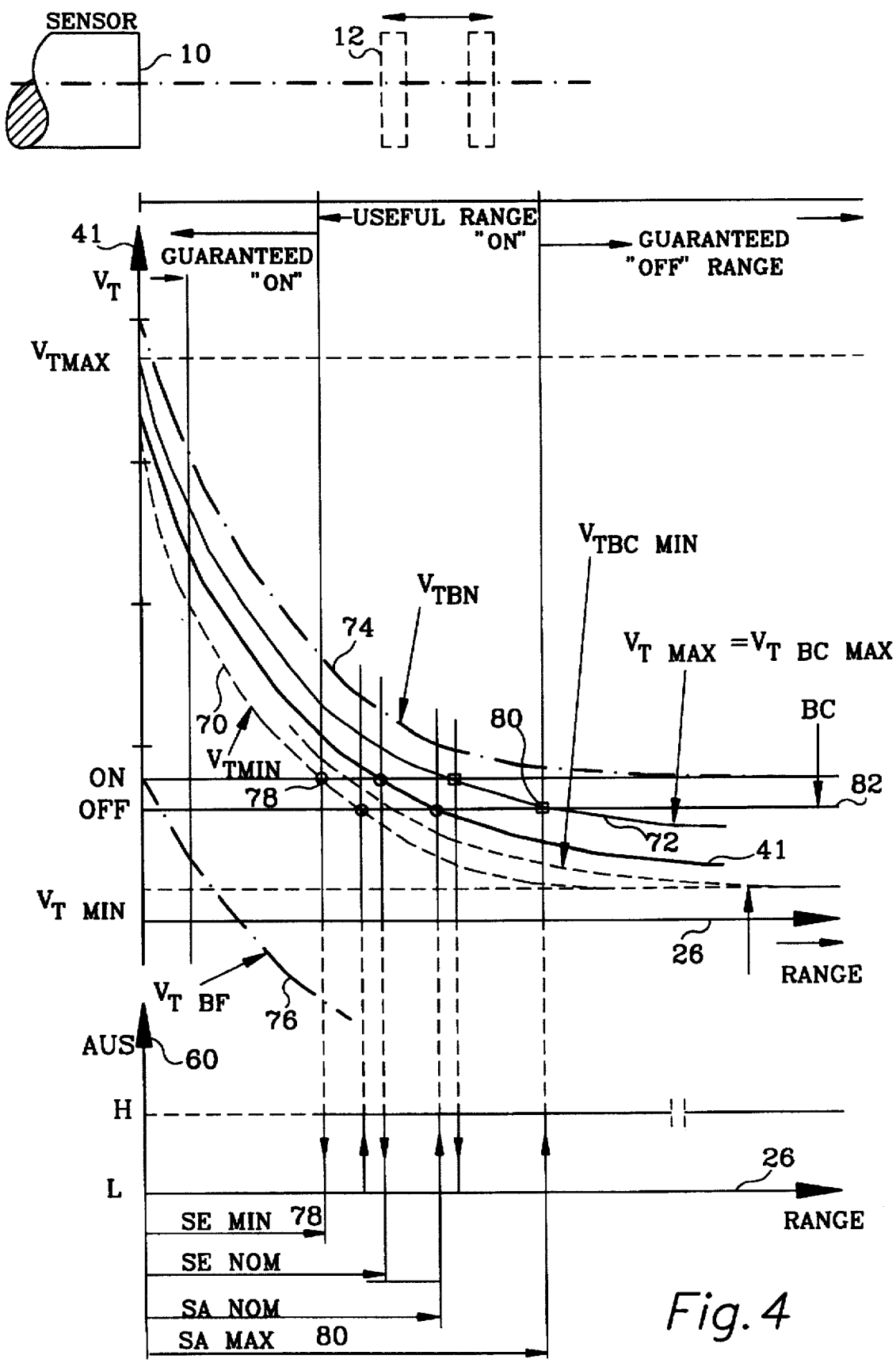
FIG. 4 is graph of the voltage indications for the various diagnostic checks performed by the testing and evaluation circuitry.

An error recognition means is implemented as a part of measuring device 8, as shown in FIG. 3, with its characteristics revealed in FIG. 4. One feature is the integrity of the wiring between sensor 10 and interface 16. In case of disruptions of a single wire or a double wire, disruptions of all single wires, or shorts between single wires or between all three wires, a first wire 64 connected between inductor 24 and amplifier 38, a second wire 66 connected between inductor 28 and amplifier 38, and a third wire being a ground GRD 68 connected to the other terminals of inductors 24 and 28 that are not connected to amplifier 38, bridge 20 is unbalanced or detuned in such a way that signal $V_T$ 41 is outside of the tolerated range which is defined by $V_{Tmin}$ 70 and $V_{Tmax}$ 72. This may be monitored in an elegant way by means of a window discriminator FD 56 and may be indicated as an information H (High) or L (Low) at the status output STA 62. This monitoring of the status also covers the larger debalancing or detuning of bridge 20 by sensor 10.

Another feature is that errors within the signal-processing chain of interface 16 can be detected. In case of an error within the signal-processing chain of interface 16 (for example, a failure of differential amplifier 38, of threshold value switch SS 54, or of voltage reference REF 58), an output AUS 60 has one of two possible conditions, that is, "H" or "L". System 18, at this phase, cannot decide whether, for example, signal "H" appears because target 12 has been removed or whether signal "H" appears because an error within the signal processing of interface 16 is present. By means of an external check signal BN 46, a resistor $R_N$ 42 can be connected in parallel with the resistor 32 via the switch 50, and bridge 20 may be debalanced or detuned in such a way that its condition corresponds to the condition "target proximate". This is shown by a signal behavior $V_{TBN}$ 74 as indicated in FIG. 4. If herewith output AUS 60 does not change from "H" to "L", then an error has appeared within the signal-processing chain of interface 16. On the other hand, switch 52 may be actuated by a check signal BF 48 when there is an indication "L" so that resistor $R_F$ 44 is connected in parallel with the resistor 34 and bridge 20 is debalanced or detuned correspondingly according to the condition "target removed". The resulting signal behavior is shown by $V_{TBF}$ 76 in FIG. 4. If herewith output AUS 60 changes from "L" to "H", then this is an indication of an orderly operating signal-processing chain of interface 16.

In summary, by means of check signals BN 46 and BF 48, information is received indicating whether the signal-processing chain of interface 16 is forwarding the debalancing or detuning of bridge 20 in the correct manner. Until now, that fact was not monitored as to whether the debalancing or detuning of bridge 20 was caused by the motion of target 12 to be detected or by changes of the components of bridge 20. With the present invention, such debalancing or detuning can be determined and evaluated.

A typical rated transfer characteristic of the range sensor 10 according to the invention is shown in FIG. 4 by means of the solid line, whereat the voltage $V_T$ 41 is shown as a function of range or distance 26. If one takes into account all influences such as, for example, temperature changes within sensor 10 and within interface 16, the long-term drift of the bridge 20 components as well as the manufacturing tolerances, then in the worst case a tolerated offset range results which is defined by the curves $V_{Tmin}$ 70 and $V_{Tmax}$ 72.

If the levels "on" and "off" represent the values of the thresholds of the threshold value switch SS 54 in the worst case, then a minimum switching-on range $S_{Emin}$ 78 and a maximum switching-off range $S_{Amax}$ 80 result. From the side of the user, it now has to be made sure that the target within the range "guaranteed on" takes the position "proximate" and in the range "guaranteed off" takes the position "remote". Due to practical reasons, the range "on", for example, at a radial approach of the target, is limited to the range "useful range 'on'".

The invention starts from the fact that for a defined constellation of the measuring device a defined behavior of the function $V_T$ 41=F(range), including the scale factor, is present within the limits $V_{Tmin}$ 70 and $V_{Tmax}$ 72. If the characteristic, at the time of checking, is outside the tolerated offset range given by $V_{Tmin}$ 70 and $V_{Tmax}$ 72, then a distortion is present. This check, for instance, may be done by means of an analog/digital conversion of the transfer characteristic and by comparison with information related to $V_{Tmin}$ 70 and $V_{Tmax}$ 72 memorized by a read only memory ROM, whereat, for example, a microprocessor is comparing the corresponding values.

A simple analog solution to detecting the above-noted functional problem may be done via an input BC (balance check) 82 at the position of the target within the range "guaranteed off", which input actuates a switch 84, by which a resistor $R_c$ 86 is connected in parallel with resistor 34. Hereby, bridge 20 is debalanced or detuned by an amount BC 82 shown in FIG. 4. If the actual transfer characteristic is lying within the permissible tolerated offset range, then the displaced characteristic must fall below the level $V_{Tmin}$ 70 and status indication STA 62 must be activated. If target 12 is located within the range "guaranteed off", then status indication STA 62 must not be activated in the event where signal BC 82 is not present.

With respect to the above-described figures of the attached drawing, only one embodiment of the invention has been described, although other embodiments and implementations of the present invention are available.

The claimed invention solves problems according to its characterizing features. Further advantageous embodiments of the present measuring device are disclosed in the claims.

I claim:

1. A distance/position detector comprising:
   a bridge having first and second resistors, and first and second inductors, wherein the first and second resistors are connected in series, and the first and second inductors are connected in series;
   a reference terminal connected to a common connection of the first and second inductors;
   an oscillator connected to a common connection of the first and second resistors and to a reference terminal; and
   an amplifier having a first input connected to a common connection of the first resistor and the first inductor, and having a second input connected to a common connection of the second resistor and the second inductor, and having an output; and
   wherein:
   the first inductor has a reactance that varies relative to a distance between the first inductor and a target;
   a first electrical input from said oscillator to the common connection of the first and second resistors relative to the reference terminal results in a second electrical input to the first and second inputs of said amplifier; and
   a voltage at the output of said amplifier, relative to the reference terminal, indicates the distance between the first inductor and the target; and
   further comprising:
   a first normally open switch connected in series with a third resistor, connected between the common connection of the first and second resistors and the first input of said amplifier; and
   a second normally open switch connected in series with a fourth resistor, connected between the common connection of the first and second resistors and the second input of said amplifier; and
   wherein:
   if the first switch is closed, the third resistor is connected in parallel with the first resistor, said bridge is unbalanced in such a way that the voltage at the output of said amplifier has a value that corresponds to a condition "target proximate"; and
   if the second switch is closed, the fourth resistor is connected in parallel with the second resistor, said bridge is debalanced in such a way that the voltage at the output of said amplifier has a value that corresponds to a condition "target removed".

2. A target distance detector comprising:

a first inductor having a reactance sensitive that is variable relative to a distance from a target, having a first terminal connected to a reference terminal, and having a second terminal;

a second inductor having a given reactance, having a first terminal connected to the reference terminal, and having a second terminal;

a first resistor having a first terminal connected to the second terminal of the first inductor and having a second terminal;

a second resistor having a first terminal connected to the second terminal of the second inductor and having a second terminal connected to the second terminal of the first resistor;

a first differential amplifier having a first input connected to the second terminal of the first inductor and having a second input connected to the second terminal of the second inductor, and having an output;

an oscillator having an output connected to the second terminal of the first and second resistors;

a third resistor having a first terminal connected to the first terminal of the first resistor, and having a second terminal;

a fourth resistor having a first terminal connected to the first terminal of the second resistor, and having a second terminal;

a first switch having a first terminal connected to the second terminal of the third resistor, and having a second terminal connected to the second terminal of the first resistor;

a second switch having a first terminal connected to the second terminal of the fourth resistor, and having a second terminal connected to the second terminal of the second resistor;

a reference voltage source having an output;

a second differential amplifier having a first input connected to the output of the first differential amplifier, having a second input connected to the output of the reference voltage source, and having an output; and a third differential amplifier having a first input connected to the output of the first differential amplifier, having a second input connected to the reference voltage source, and having an output.

3. A range/position measuring device comprising:

a symmetrical bridge circuit supplied by a source (22) and having in each of its branches the series connection of a resistor (32, 34) and a nonresistive element (24, 28) detunable by a target (12), with the diagonal of said bridge circuit being connected to an evaluation circuit (38, 56, 54, 58) in order to provide a first signal (L) when said target is proximate and to provide a second signal (H) when said target is removed, in dependence from a transfer characteristic ($V_T = f(s)$) exceeding or falling below a predetermined reference value; and characterized by:

the provision of an offset range between a maximum transfer characteristic ($V_{Tmax}$) and a minimum transfer characteristic ($V_{Tmin}$) with said offset range being determined by permissible tolerances of the bridge components and by checking whether the actual transfer characteristic $V_T$ is within said offset range;

a tolerated offset range according to the differential between the minimum and the maximum transfer characteristic is digitally memorized and that the actual value ($V_T$) after analog/digital conversion is checked whether it lies within the tolerated offset range;

a differential amplifier (38) connected to the diagonal of the bridge circuit (24, 28, 32, 34);

a threshold value switch (54) connected to the output of the differential amplifier (38); and a window discriminator (56) connected to the output of the differential amplifier (38);

whereat the threshold value switch (54) and the window discriminator (56) each are additionally connected to a reference voltage source (58).

4. The distance/position detector of claim 1 further comprising:

a third normally open switch connected in series with a fifth resistor, connected between the common connection of the first and second resistors and the second input of said amplifier; and wherein if the third switch is closed, the fifth resistor is connected in parallel with the second resistor, then bridge 20 is debalanced in such a way that adequacy of the functional relationship of the distance between the first inductor and the target, and the voltage at the output of said amplifier, is indicated.

5. The distance/position detector of claim 4 further comprising:

a reference voltage source;

a threshold value switch having a first input connected to the output of said amplifier, a second input connected to said reference voltage source, and an output for indicating whether there is an error in said bridge or amplifier; and a window discriminator having a first input connected to the output of said amplifier, having at least a second input connected to said reference voltage source, and having an output for indicating the adequacy of the functional relationship of the distance between the first inductor and the target, and the voltage at the output of said amplifier.

6. An object position detector comprising:

oscillator means for outputting a first alternating current (AC) electrical signal;

bridge means connected to said oscillator means, for having an inductive reactance that varies proximate to distance of said bridge means from an object and that causes said bridge means to become unbalanced and output a second AC electrical signal;

amplifier means, connected to said bridge means, for processing the second AC electrical signal;

a diagnostic means, connected to said amplifier means and bridge means, for detecting interconnection disruptions, false object position indications, and distorted functions of magnitudes of processed second AC electrical signals versus the distance of said bridge means from the object, if the magnitudes of the processed second AC electrical signals are outside of a tolerated range;

first switching means, connected to said bridge means and amplifier means, for unbalancing said bridge means in such a way that an output of said amplifier means has a value that corresponds to a condition "target proximate"; and second switching means, connected to said bridge means and amplifier means, for unbalancing said bridge means in such a way that the output of said amplifier means has a value that corresponds to a condition "target removed".

7. A range/position measuring device comprising:

a symmetrical bridge circuit supplied by a source (22) and having in each of its branches the series connection of a resistive element (32, 34) and a nonresistive element (24, 28) detunable by a target (12), with the diagonal of said bridge circuit being connected to an evaluation circuit (38, 56, 54, 58) in order to provide a first signal (L) when said target is proximate and to provide a second signal (H) when said target is removed, in dependence from a transfer characteristic ($V_T=f(s)$) exceeding or falling below a predetermined reference value; and characterized by the provision of an offset range between a maximum transfer characteristic ($V_{Tmax}$) and a minimum transfer characteristic ($V_{Tmin}$) with said offset range being determined by permissible tolerances of the bridge components and by checking whether the actual transfer characteristic $V_T$ is within said offset range;

if the actual transfer characteristic $V_T$ is not within said offset range then a distortion or error is present;

a first switch, connected to said bridge circuit and said evaluation circuit, wherein if said first switch is actuated then said bridge circuit is unbalanced in such a way that the voltage at an output of said evaluation circuit has a value that corresponds to a condition "target proximate"; and a second switch, connected to said bridge circuit and said evaluation circuit, wherein if said second switch is actuated then said bridge circuit is unbalanced in such a way that the voltage at the output of said evaluation circuit has a value that corresponds to a condition "target removed".

8. The measuring device according to claim 3, whereat the bridge circuit comprises:

an inductive reactance (24) detunable by the target (12);

a fixed inductive reactance (28); and two resistors (32, 34); and wherein each resistor is arranged in a series connection to said each inductive reactance and whereat the resistors are arranged in an interface (16) arranged remote to the sensor (10, 24, 28); and characterized in that via inputs (46, 48, 82) of said interface (16) further resistors (42, 44, 86) may be connected in parallel to said resistors (32, 34) and the outputs (60, 62) of the threshold value switch (54) and of the window discriminator (56) then are evaluated.

\* \* \* \* \*